United States Patent Office 3,452,115
Patented June 24, 1969

3,452,115
PROCESS FOR DIMERIZATION OF OLEFINS
Wolfgang Schneider, Broadview Heights, Ohio, assignor to The B. F. Goodrich Company, New York, N.Y., a corporation of New York
No Drawing. Filed Oct. 20, 1966, Ser. No. 588,008
Int. Cl. C07c 3/10
U.S. Cl. 260—683.15      1 Claim

ABSTRACT OF THE DISCLOSURE

Dimers and co-dimers of ethylene, propylene and butene-1 are prepared in good yields and at high conversions using a catalyst consisting of a nickel compound mixed with an alkyl aluminum compound and a halide. The halide can be introduced as part of the nickel compound or supplied from a third catalyst component such as a halogen-containing olefin.

---

This invention relates to an improved method for preparing dimers and co-dimers of alpha-olefins.

Valuable and useful dimers and co-dimers of straight chain alpha-olefins which contain 2 to 4 carbon atoms as ethylene, propylene, and butene are readily prepared in accordance with this invention to form valuable unsaturated hydrocarbons in improved yields and conversions above 90% by reacting said alpha-olefins in the presence of a nickel salt mixed with an alkyl aluminum compound and a halide which is present with nickel or supplied from a third component.

The nickel salts include, for example, salts of inorganic and organic acids as nickel chloride, nickel iodide, nickel bromide, nickel sulfate, nickel acetate, nickel oxalate and the like as well as chelates such as nickel acetylacetonate or nickel dimethylglyoximate in which the nickel atom is attached to two functional groups of a molecule by a main valence bond and coordinatively.

The alkyl aluminum compounds have the formula $R_3Al$ wherein R is an alkyl radical containing 2 to 12 carbon atoms, preferably 2 to 8. Typical compounds include triethyl aluminum, tripropyl aluminum, triisobutyl aluminum, tributyl aluminum, trihexyl aluminum and the like.

The amount of the catalyst components used may be varied from about 0.0001 to 10 millimols, preferably about 0.001 to 1, per mol of alpha-olefin, in a molar ratio of greater than one mol of alkyl aluminum per mol of nickel salt up to a molar ratio of 10 to 1.

In preparing the dimers and co-dimers, the catalyst may be prepared by adding the components separately to a reactor, preferably either in the alpha-olefin to be dimerized or in an inert solvent such as benzene or toluene. Either catalyst component may be charged first and the other added gradually thereto while stirring the entire reaction mixture. This reaction mixture, prepared in situ or separately, is heated in the presence of the alpha-olefin at a temperature of about −20° C. to 150° C., preferably 10° C. to 60° C. The reaction is conducted under sufficient pressure to keep the reactants in liquid state. This will depend on the temperature of reaction and olefin, for example, propylene at −30° C., 2 atmospheres; at 50° C., 20 atmospheres; at 85° C., 40 atmospheres; and ethylene at 0° C., 40 atmospheres. After the reaction the excess alpha-olefin is removed and the product distilled to isolate the desired products.

The catalyst may also contain additional electron donors if desired. Such materials known to those skilled in the art include alkyl phosphites; alkyl phosphine such as tributyl phosphine or triisooctyl phosphine; aryl phosphines such as triphenyl phosphine; halogen-containing olefins; and the like. Halogen-containing olefins function both as electron donors and a source of halide if required, as when a nickel salt, not a halide, is used, such as in the nickel acetylacetonate, tributyl aluminum and 1-chloropropene-1 catalyst system. Such halogen-containing olefins include, for example, crotyl chloride, 2-bromopropene-1, 1-bromopropene-1, 3-chloro-2-methyl propene, 3-chloropropene, 1-chloropropene-1, 2-chloropropene-1, 2-chlorobutene-2, and the like. Preferred are halogen-containing olefins, preferably containing 2 to 8 carbon atoms and chlorine or bromine. The amount of electron donor used may be varied quite widely but normally is in the range of about 0.001 to 100 millimols per mol of olefin, more preferably about 0.01 to 25 millimols.

Useful catalyst combinations are $NiCl_2$ or $NiBr_2$ and a trialkyl aluminum; and a nickel salt, a trialkyl aluminum, and alkenyl halide.

In a series of runs, nickel bromide and an electron donor in ⅔ of the volume of benzene used were charged to an oxygen- and moisture-free flask. Triisobutyl aluminum in the remainder of the benzene was slowly added with stirring. The resulting catalyst was then charged to an autoclave which was purged with argon, sealed and pressured with propylene. The autoclave was heated and after about 24 hours the pressure was released and the reaction product distilled. The conversions were 95%. The amount of nickel bromide and electron donor in millimols, the propylene in kilograms, the benzene and triisobutyl aluminum in milliliters, the temperature in °C. and the percent of resulting products are set forth in the table.

TABLE

| Run | 1 | 2 | 3 | 4 | 5 | 6 |
|---|---|---|---|---|---|---|
| NiBr₂ (mm.) | 45 | 4 | 4 | 2 | 4 | 4 |
| 3-chloropropene-1 (mm.) | 100 | | | | | 16 |
| 2-chlorobutene-1 (mm.) | | 16 | | | | |
| 3-chloro-2-methyl propene (mm.) | | | 16 | | | |
| 2,3-dichloropropene (mm.) | | | | 8 | | |
| Cis-1, 2-dichloroethylene (mm.) | | | | | 16 | |
| Triphenyl phosphine (mm.) | | | | | | 2 |
| Propylene (kg.) | 1.1 | 1.3 | 1.1 | 0.1 | 1.8 | 1.4 |
| Benzene (ml.) | 105 | 100 | 100 | 50 | 100 | 100 |
| TIBA (ml.) | 7.5 | 6 | 6 | 3 | 6 | 6 |
| Temperature, °C | 65 | 50 | 50 | 50 | 55 | 55 |
| 4-methylpentene-1 (percent) | 5.1 | 3.8 | 3.7 | 13.7 | 2.5 | 3.6 |
| 4-methylpentene-2 (percent) | 57.4 | 56.3 | 61.1 | 54.8 | 57.3 | 38.7 |
| 2-methylpentene-2 (percent) | 2.6 | 3.5 | 4.1 | 3.4 | 5.4 | 23.4 |
| Trans-hexene-2 (percent) | 26.8 | 29.1 | 25.0 | 22.6 | 28.5 | 7.0 |
| Cis-hexene-2 (percent) | 6.5 | 6.2 | 5.6 | 5.5 | 6.1 | 7.2 |
| 2,3-dimethyl butene-2 (percent) | 1.6 | 1.1 | 0.5 | 0 | 0.2 | 0.1 |

When this example is repeated with nickel bromide and triisobutyl aluminum, and with ethylene or ethylene and propylene, similar good yields of dimers and co-dimers are obtained.

These olefin dimers and co-dimers have many commercial uses. For example, 4-methylpentene-2 is isomerized to 4-methyl-pentene-1 and readily polymerized with reduced metal catalysts as the well known Ziegler type reduced titanium catalysts to form useful plastics.

I claim:
1. A method for preparing dimers and co-dimers of α-olefins which comprises:
  contacting, as the sole monomers, one or more α-olefins selected from the group consisting of ethylene, propylene and butene-1 with a catalyst composition obtained by mixing three components consisting of
    (1) a nickel compound selected from the group consisting of nickel bromide, nickel chloride, nickel acetylacetonate and nickel dimethylglyoximate,
    (2) an alkyl aluminum compound having the formula $R_3Al$ wherein R is an alkyl group containing 2 to 12 carbon atoms, the molar ratio of the alkyl aluminum compound to nickel com- pound ranging from 1:1 up to about 10:1 with the total amount of the alkyl aluminum compound and the nickel compound ranging from about 0.001 to 1 millimol per mol of α-olefin, and (3) a halogen-containing olefin containing from 2 to 8 carbon atoms and present in an amount ranging from about 0.001 to 100 millimols per mol of α-olefin; and dimerizing at a temperature between about 10° C. and 60° C. and under a pressure sufficient to maintain the monomers in a liquid state.

References Cited

UNITED STATES PATENTS 3,413,376  11/1968  Cleary _____ 260—683.15

PAUL M. COUGHLAN, *Primary Examiner*.

U.S. Cl. X.R.

252—429

UNITED STATES PATENT OFFICE
CERTIFICATE OF CORRECTION

Patent No. 3,452,115                                  June 24, 1969

Wolfgang Schneider

It is certified that error appears in the above identified patent and that said Letters Patent are hereby corrected as shown below:

Column 4, line 5, insert the following references:

| | | | |
|---|---|---|---|
| 2,781,410 | 2/1957 | Ziegler, et al. | 260-683.15 |
| 2,969,408 | 1/1961 | Nowlin, et al. | 260-683.15 |
| 3,058,963 | 10/1962 | Vandenberg | 260-85.3 X |
| 3,084,148 | 4/1963 | Youngman, et al. | 252-429 X |
| 3,096,385 | 7/1963 | McConnell, et al. | 260-683.15 |
| 3,170,905 | 2/1965 | Ueda, et al. | 260-94.3 |
| 3,215,682 | 11/1965 | Farrar, et al. | 260-683.15 |
| 3,306,948 | 2/1967 | Kealy | 260-680 |
| 3,321,546 | 5/1967 | Roest, et al. | 260-683.15 |
| 3,390,195 | 2/1968 | Chappell, et al. | 260-680 X |

Signed and sealed this 17th day of November 1970.

(SEAL)
Attest:

EDWARD M. FLETCHER, JR.                              WILLIAM E. SCHUYLER, JR.
Attesting Officer                                             Commissioner of Patents